(12) United States Patent
Alnajjar et al.

(10) Patent No.: US 10,968,073 B1
(45) Date of Patent: Apr. 6, 2021

(54) TOUCHLESS ELEVATOR KEYBOARD SYSTEM

(71) Applicant: United Arab Emirates University, Al Ain (AE)

(72) Inventors: Fady S Alnajjar, Al Ain (AE); Waleed Ahmed, Al Ain (AE); Munkhjargal Gochoo, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/000,460

(22) Filed: Aug. 24, 2020

Related U.S. Application Data

(60) Provisional application No. 63/038,249, filed on Jun. 12, 2020.

(51) Int. Cl.

| | |
|---|---|
| *B66B 1/46* | (2006.01) |
| *G06F 3/16* | (2006.01) |
| *G08B 21/04* | (2006.01) |
| *B66B 1/52* | (2006.01) |
| *B66B 5/02* | (2006.01) |
| *B66B 3/00* | (2006.01) |
| *B66B 1/34* | (2006.01) |

(Continued)

(52) U.S. Cl.
CPC ............ *B66B 1/468* (2013.01); *B66B 1/3461* (2013.01); *B66B 1/3469* (2013.01); *B66B 1/52* (2013.01); *B66B 3/002* (2013.01); *B66B 5/0012* (2013.01); *B66B 5/025* (2013.01); *G06F 3/017* (2013.01); *G06F 3/167* (2013.01); *G08B 21/0476* (2013.01); *B66B 2201/101* (2013.01); *B66B 2201/4623* (2013.01); *B66B 2201/4638* (2013.01); *B66B 2201/4646* (2013.01); *B66B 2201/4653* (2013.01)

(58) Field of Classification Search
USPC .......................................... 187/398
See application file for complete search history.

(56) References Cited

U.S. PATENT DOCUMENTS 7,404,471 B2 * 7/2008 Felder ..................... B66B 1/462
  187/395
9,477,317 B1 * 10/2016 Clements ................ B66B 1/468
(Continued)

*Primary Examiner* — Christopher Uhlir
(74) *Attorney, Agent, or Firm* — Hayes Soloway PC

(57) ABSTRACT

A touchless keyboard system for operating an elevator through an existing touch-sensitive keyboard of the elevator, the touchless keyboard system including a touchless detection device comprising at least one sensor for detecting non-touch indications from users for opted floors, an actuation device comprising at least one actuator for physical engaging buttons of the existing touch-sensitive keyboard of the elevator corresponding to the opted floors, and a controller in communication with the detection device and with the actuation device for receiving and processing output signals from the at least one sensor and controlling movement of the at least one actuator based on the processed output signals. The touchless keyboard system further comprises a touchless keyboard housing for receiving the touchless detection device and the actuation device, where the touchless keyboard housing is operatively mountable to the touch-sensitive keyboard of the elevator. There is also provided a device unit, and a method of operating an elevator through an existing touch-sensitive keyboard of the elevator.

20 Claims, 9 Drawing Sheets

(51) Int. Cl.
 _B66B 5/00_ (2006.01)
 _G06F 3/01_ (2006.01)

(56) References Cited

U.S. PATENT DOCUMENTS 10,691,397 B1 * 6/2020 Clements ............ G06F 3/04817
2019/0292011 A1 * 9/2019 Makela ................... B66B 1/52

* cited by examiner

TOUCHLESS ELEVATOR KEYBOARD SYSTEM

CROSS-REFERENCE TO RELATED APPLICATION

This application is continuation of U.S. Patent Application Ser. No. 63/038,249, filed on Jun. 12, 2020, the entire disclosure of which is incorporated herein by reference.

FIELD OF THE INVENTION

The present invention relates to a touchless keyboard, and more particularly a touchless keyboard system, device unit and method for operating an elevator through an existing touch-sensitive keyboard of the elevator to prevent contamination and spread of infections.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Public surfaces are hotspots for bacteria and germs, and a lot of such surfaces retain more bacteria than public washrooms do. Bacteria present on an elevator button is almost 40 times higher than on a public toilet seat, according to new findings. Research carried out in hotels, restaurants, banks, offices and airports, showed that the level of bacteria on elevator buttons averaged 313 colony forming units (CFUs) per square centimeter, compared to 8 CFUs on an average public toilet seat. Among the common bacteria likely to be found are *E. coli, Staphylococcus aureus* and methicillin-resistant *Staphylococcus aureus* (MRSA). Moreover, since the outbreak of COVID-19, it is well known that such viruses spread primarily through droplets people emit when they cough, sneeze, talk, sing, or exhale. Those droplets can land on anyone or anything nearby, which is why social distancing is so important. Prominently, such droplets tend to land on surfaces or be transferred there when an infected individual uses his hands to touch a public surface or object.

Therefore, a touchless system is critical for eliminating contamination and infection, to fight virus outbreaks and avoid cross-infections considering that public surfaces such as elevator buttons, as per health experts, have the potential for spreading high-risk infections.

Accordingly, there exists a need for a touchless keyboard, which protects users from being susceptible to contaminated public surfaces and prevent spread of infections.

SUMMARY OF THE INVENTION

Therefore it is an object of the present invention to develop a touchless keyboard system for operating an elevator through an existing touch-sensitive keyboard of the elevator to prevent contamination and spread of infections.

In an aspect of the invention, the present invention relates to a touchless keyboard system for operating an elevator through an existing touch-sensitive keyboard of the elevator, the touchless keyboard system comprising a touchless detection device comprising at least one sensor for detecting non-touch indications from users for opted floors, an actuation device comprising at least one actuator for physical engaging buttons of the existing touch-sensitive keyboard of the elevator corresponding to the opted floors, and a controller in communication with the detection device and with the actuation device for receiving and processing output signals from the at least one sensor and controlling movement of the at least one actuator based on the processed output signals.

In another aspect of the invention, there is provided a touchless keyboard device unit for operating a single button of an elevator through an existing touch-sensitive keyboard of the elevator, the touchless keyboard device unit comprising a sensor for detecting a non-touch indication from a user for an opted floor; an actuator for physically engaging the buttons of the existing touch-sensitive keyboard of the elevator corresponding to the opted floor, a controller in communication with the sensor and with the actuator for receiving and processing an output signal from the sensor and controlling movement of the actuator based on the processed output signal; a power supply for providing power to the sensor, the actuator and the controller; and a housing for enclosing the sensor, the actuator and the controller, and the power supply.

In yet a further aspect of the invention, there is provided a touchless keyboard system for operating an elevator through an existing touch-sensitive keyboard of the elevator, the touchless keyboard system comprising a plurality of touchless keyboard device units operating independently and without any central coordination between them.

In yet a further aspect of the invention, a touchless keyboard system, method and unit described herein are not limited to the operation of elevators, however can be configured to operate any other systems and devices through the touchless detection and actuation of buttons and keyboards related to these devices with any adjustments required.

In an embodiment of the present invention, the at least one sensor is an infra-red (IR) sensor, a motion sensor or a proximity sensor.

In an embodiment of the present invention, the at least one actuator is a linear actuator or a push solenoid.

In another embodiment of the present invention, the touchless keyboard system further comprises a touchless keyboard housing for receiving the touchless detection device and the actuation device, where the touchless keyboard housing is configured to be operatively mountable to the touch-sensitive keyboard of the elevator.

In another embodiment of the present invention, the touchless keyboard system further comprises a power source for providing electrical power to the detection device, the actuation device and the controller.

In another embodiment of the present invention, the non-touch indications from the users are physical gestures such as pointing of a finger or waving of a hand.

In another embodiment of the present invention, the touchless keyboard housing comprises openings for allowing manual engagement of the at least one actuator for the operation of the elevator when required.

In another embodiment of the present invention, the at least one sensor comprises a sound sensor and the indications from the users comprise voice commands.

In another embodiment of the present invention, the touchless keyboard system further comprises a thermal camera for monitoring and controlling number of users entering the elevator, and triggering an alarm if the number of users exceeds a predetermined threshold value.

In another embodiment of the present invention, the thermal camera is further configured for monitoring body temperatures of the users and triggering an alarm if an abnormal body temperature is detected.

In another embodiment of the present invention, the touchless keyboard system further comprises a wireless communication unit in communication with the controller and a display screen for displaying a QR code identifying the elevator for receiving selections for the opted floors from the users using a mobile application running on their personal electronic devices, wherein the communication unit of the touchless keyboard system is further configured to be wirelessly connected to the mobile application.

In another embodiment of the present invention, the actuation device comprises sliding rails for enabling the at least one actuator to move along the sliding rails to push the buttons on the existing touch-sensitive keyboard of the elevator corresponding to the opted floor, such that number of the at least one actuator is less than the number of buttons on the existing touch-sensitive keyboard of the elevator.

In another embodiment of the present invention, the at least one actuator is one actuator.

In another embodiment of the present invention, the number of the at least one actuator is equal to the number of the buttons on the existing touch-sensitive keyboard of the elevator, such that each actuator among the at least one actuator is configured to be operatively connected with one button among the buttons.

In another embodiment of the present invention, the at least one sensor is an Infra-Red sensor, and wherein the number of the at least one sensor is equal to the number of the buttons on the existing touch-sensitive keyboard of the elevator, such that each sensor among the at least one sensor is configured to detect non-touch indications corresponding to one specific floor and one specific button among the buttons.

In another embodiment of the present invention, the controller is configured to trigger an error message in case two or more sensors detect a same non-touch indication from a user within a predefined time period.

In another embodiment of the present invention, the controller is configured to trigger the actuation device only if a single non-touch indication is received from a user after a predefined period of time subsequent to receiving the non-touch indication.

In another embodiment of the present invention, the predefined period of time is around 3 seconds.

In another embodiment of the present invention, the touchless keyboard system further comprises an artificial intelligence device in communication with the controller for receiving and analyzing user related physical and behavioral data over time to build intelligence information associated to the users, wherein the intelligence information is used by the controller for constituting the non-touch indications of the users for the opted floors of the elevator.

In another embodiment of the present invention, the touchless keyboard housing is mechanically mountable over the existing touch-sensitive keyboard of the elevator using magnets, clips or glue.

In another embodiment of the present invention, the power source is a 5V rechargeable battery.

As another aspect of the present invention, there is provided a method of operating an elevator through an existing touch-sensitive keyboard of the elevator is disclosed, the method comprising the steps of using a touchless detection device comprising at least one sensor for detecting non-touch indications from users for opted floors; and based on the non-touch indications from the users, using an actuation device comprising at least one actuator for physically engaging buttons of the existing touch-sensitive keyboard of the elevator corresponding to the opted floors.

In an embodiment of the present invention, the at least one sensor is an infra-red (IR) sensor, a motion sensor or a proximity sensor.

In another embodiment of the present invention, the at least one actuator is a linear actuator or a push solenoid.

In another embodiment of the present invention, the non-touch indications from the users are physical gestures such as pointing of a finger or waving of a hand.

In another embodiment of the present invention, the at least one sensor comprises a sound sensor and the indications from the users comprise voice commands.

In another embodiment of the present invention, the actuation device comprises sliding rails for enabling the at least one actuator to move along the sliding rails to push the buttons on the existing touch-sensitive keyboard of the elevator corresponding to the opted floor, such that number of the at least one actuator is less than the number of buttons on the existing touch-sensitive keyboard of the elevator.

In another embodiment of the present invention, the at least one actuator is one actuator.

In another embodiment of the present invention, the number of the at least one actuator is equal to the number of the buttons on the existing touch-sensitive keyboard of the elevator, such that each actuator among the at least one actuator is configured to be operatively connected with one button among the buttons.

In another embodiment of the present invention, the at least one sensor is an Infra-Red sensor, and wherein the number of the at least one sensor is equal to the number of the buttons on the existing touch-sensitive keyboard of the elevator, such that each sensor among the at least one sensor is configured to detect non-touch indications corresponding to one specific floor and one specific button among the buttons.

In another embodiment of the present invention, a controller is configured to trigger an error message in case two or more sensors detect a same non-touch indication from a user within a predefined time period.

In another embodiment of the present invention, a controller is configured to trigger the actuation device only if a single non-touch indication is received from a user after a predefined period of time subsequent to receiving the non-touch indication.

In another embodiment of the present invention, the predefined period of time is around 3 seconds.

In another embodiment of the present invention, a touchless keyboard housing is mechanically mountable over the existing touch-sensitive keyboard of the elevator using magnets, clips or glue.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1A:
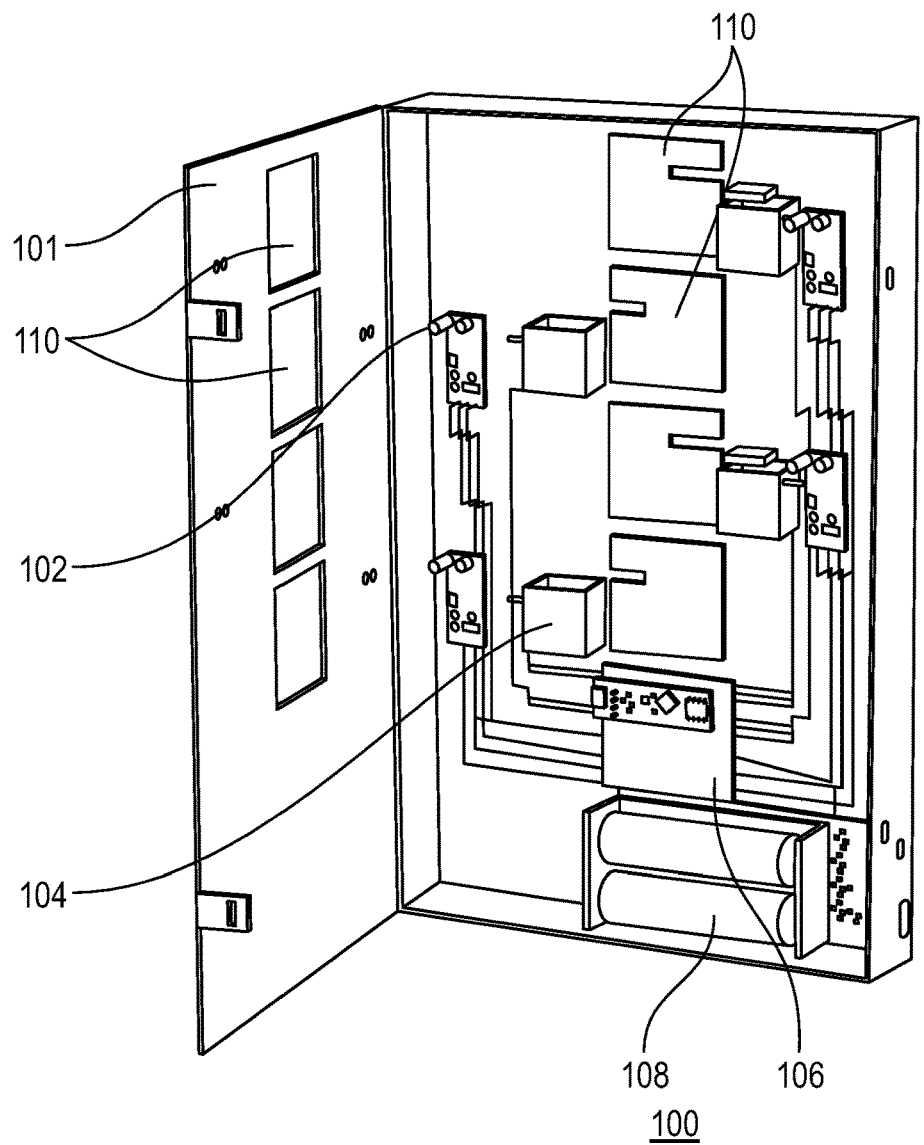
FIGS. 1(a) and (b) illustrate front view and side views, respectively, of a basic design of the touchless keyboard system for an elevator, in accordance with an embodiment of the present invention.

The aspects of a touchless keyboard system for operating an elevator through an existing touch-sensitive keyboard system of the elevator to prevent contamination and spread of infections, according to the present invention will be described in conjunction with FIGS. 1-6. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims. Though the system, device and method related to the present invention are herein described primarily for the operation of elevators, however a person skilled of the art should appreciate that the system, device and method are configured to operate with any other system or device using touch-sensitive keyboards or buttons.

The proposed solution aims at designing a touchless keyboard system 100 for operating an elevator using an existing touch keyboard. The touchless keyboard system 100 comprises a touchless detection device 102 comprising at least one sensor 103 for detecting non-touch indications (signals) from users for opted floors, an actuation device 104 comprising at least one actuator 105 for physically engaging push-buttons of the existing touch-sensitive keyboard of the elevator corresponding to the opted floors, and a controller 106 in communication with the detection device 102 and with the actuation device 104 for receiving and processing output signals from the at least one sensor 103 and controlling movement of the at least one actuator 105 based on the processed output signals. In an embodiment of the present invention, the touchless keyboard system 100 further comprises a touchless keyboard housing 101 for receiving the touchless detection device 102 and the actuation device 104, where the touchless keyboard housing 101 is configured to be operatively mountable to the touch-sensitive keyboard of the elevator.

In an embodiment of the invention, the touchless keyboard system 100 is mechanically mountable over the existing touch-sensitive keyboard of the elevator, and operates in parallel with existing elevator systems. Once the touchless keyboard system 100 is mounted and operationally connected to the existing touch-sensitive keyboard of an elevator, it is possible for a user to control the buttons on the original touch-sensitive keyboard of the elevator for selecting an opted floor by providing a non-touch signal (indication) such as pointing at the button or waving at the button—without touching (touch-less) the button. This non-touch signal by a user will be captured by the detection device 102 which is subsequently processed by the controller 106 to activate the actuation device 104 by triggering a given actuator among the at least one actuator 105 to physically engage (such as a pushing action) the button related to the original touch-sensitive keyboard of the elevator which is associated to the opted floor.

In an embodiment of the present invention, the touchless keyboard system 100 is not electrically connected to the existing touch-sensitive keyboard of the elevator any existing electrical circuitry of the elevator. According to this embodiment, the touchless keyboard system 100 is operatively connected to the existing touch-based keyboard of the elevator through a mechanical communication exclusively, and this through a physical engagement between the actuation device 104 and ng touch-sensitive keyboard of the elevator. This makes the design simple and easy to manufacture and install and yet add many useful functionalities (such as touchless technology) to existing elevators without interfering with the electronics or electrical circuitry of the existing elevators.

In an embodiment of the invention, the touchless keyboard system 100 in accordance with the present invention is safe to use and does not interfere with mechanical or electronics functionalities of the existing elevator, and works or operates in parallel with existing elevator systems.

FIGS. 1(*a*) and (*b*) illustrate front view and side views, respectively, of the touchless keyboard system 100 for an elevator, in accordance with an embodiment of the present invention. As shown in FIG. 1(*a*), the touchless keyboard system 100 comprises a touchless keyboard housing (or door) 101 with a plurality of openings 110 corresponding to each button on the existing touch-sensitive keyboard of the elevator. The housing 101 is configured to receive the components of the touchless keyboard system 100 comprising the touchless detection device 102, the actuation device 104, the controller 106 and the power supply 108.

From the process perspective, a user on entering the elevator makes a non-touch indication (signal) pertaining to a desired (or opted) floor. This indication can be any physical gesture such as pointing of a finger or waving of a hand. It can also be a voice signal. The touchless detection device 102 (comprising the at least one sensor 103) detects the non-touch indication of the user and sends out an output signal to the controller 106 on detecting an indication from the user. The controller 106 receives and processes the output signal, and based on the processing, instructs the actuation device 104 (comprising at least one actuator 105) to actuate a specific button on the touch-sensitive keyboard of the elevator. The actuation device 104, through the at least one actuator 105, accordingly actuates or physically engage (such as pushing) the button on the existing touch-sensitive keyboard of the elevator corresponding to the opted floor.

In an embodiment of the invention, each floor (and associated button on the existing touch-sensitive keyboard) is associated with (and mapped to) a specific sensor among the at least one sensor 103 of the detection device 102. This information mapping the at least one sensor 103 to the various floors/buttons on the existing touch-sensitive keyboard (and to their associated at least one actuator 105) is known a prior by the controller 106. When a signal is received by the controller 106 from the detection device 102, it automatically determines/identifies the specific sensor among the at least one sensor 103 which is triggered and determines the specific actuator among the at least one actuator 105 which needs to be triggered to actuate and physically engage the specific button related to the specific floor opted by the user. The activation of a specific sensor by a user is an indication of the desired opted floor.

In an embodiment of the invention, each sensor 103 is physically positioned in proximity of a specific button of the elevator (or a representation thereof on a separate side panel which can be physically either remote to or in proximity of the existing touch-sensitive keyboard) such that a hand gesture of the user in proximity of that specific button associated to a specific floor leads to the activation of the specific sensor among the at least one sensor 103 which is associated to that specific opted floor/button. Preferably, according to this embodiment, the at least one sensor 103 is an infrared sensor. In one embodiment, each button/floor is associated to one sensor among the at least one sensor 103. In another embodiment, a button can be associated to more than one sensor if required.

Figure 1B:
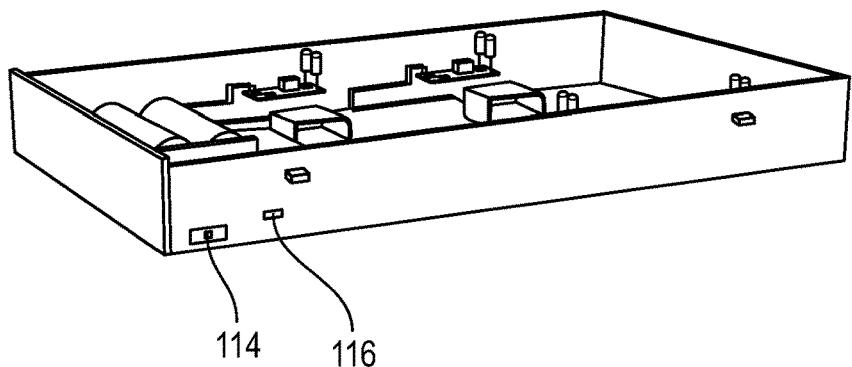

In an embodiment of the invention, as illustrated by FIG. 1(b), the touchless keyboard system 100 further comprises a USB charging port 114 for providing power supply to the system 100, and an off switch 116 positioned on a side panel of the touchless keyboard system 100 to enable to switch on and off the system 100 as required.

In an embodiment of the present invention, the plurality of openings 110 corresponding the buttons of the existing touch-sensitive keyboard of the elevator allows for manual pushing of the actuation device 104 or buttons on the existing touch-sensitive keyboard of the elevator if required, such as on occurrence of a deficiency in the system 100 or any other type of emergency.

In one embodiment of the present invention, the at least one sensor 103 is, but not limited to, an infra-red (IR) sensor, a motion sensor, or a proximity sensor and the at least one actuator is, but not limited to a linear actuator, a servo motor or a push solenoid. In an embodiment of the invention, the sensor used is a short distance IR sensor, such that on detection of a hand or finger approaching the sensor, the corresponding actuator is triggered to push the corresponding button on the existing touch-sensitive keyboard of the elevator. In an embodiment of the present invention, the touchless detection device 102 comprising at least one sensor 103 is located next to or adjacent to the buttons on the existing touch-sensitive keyboard of the elevator. In another embodiment, the touchless detection device 102 is located in proximity of a separate panel away from the touch-sensitive keyboard.

In an embodiment of the invention, the touchless keyboard system 100 further comprises a touchless keyboard housing 101 for receiving the touchless detection device 102 and the actuation device 104, where the touchless keyboard housing 101 is configured to be operatively mountable to the touch-sensitive keyboard of the elevator. The touchless keyboard housing 101 comprises openings 110 for allowing manual engagement of the at least one actuator 105 for the operation of the elevator when required.

In an embodiment of the invention, the actuation device 104 is positioned in proximity of the touch-sensitive keyboard of the elevator, and the actuation device 104 comprising at least one actuator 105 are configured to physically engage (through a lateral or vertical extension, depending on the configuration) and actuate a button on the existing touch-sensitive keyboard of the elevator corresponding to the opted floor. in an embodiment of the invention, the actuation device 104 is positioned over the existing touch-based keyboard such that the at least one actuator 105 extend along the force engagement axis of the buttons to actuate these during the activation process.

In an embodiment of the invention, each floor (and associated button on the existing touch-sensitive keyboard) is associated with (and mapped to) a specific actuator among the at least one actuator 105 of the actuation device 104. This information mapping the at least one actuator 105 to the various floors/buttons on the existing touch-sensitive keyboard (and to their associated at least one sensor 103) is known a prior by the controller 106. When a signal is received by the controller 106 from the detection device 102, it automatically determines/identifies the specific sensor among the at least one sensor 103 which is triggered and determines the specific actuator among the at least one actuator 105 which needs to be triggered to actuate and physically engage the specific button related to the specific floor opted by the user. The activation of a specific sensor by a user will lead to the actuation of the associated actuator by the controller 106.

In another embodiment of the present invention and as shown in FIG. 2(a)-(d), the touchless keyboard system 100 comprises a bar structure 202a and 202b mountable and vertically moveable along sliding rails 212a and 212b (powered by a power source 108) for enabling the actuation device 104 (subsequent to detection and controlling by the touchless detection device 102 and controller 106) to positon an actuator (among the at least one actuator 105) in proximity of the desired button to physically engage and actuate the button on the existing touch-sensitive keyboard 214 of the elevator corresponding to the opted floor. According to this embodiment, the number of actuators is less than number of buttons on the existing touch-sensitive keyboard of the elevator. In one embodiment, the at least one actuator 105 is one single actuator configured to be moveable along the rails in proximity of desired button for actuation.

In an embodiment of the invention, there is provided a touchless keyboard device unit comprising a detection device 102 comprising one sensor 103, a controller 106 and an actuation device 104 comprising one actuator 105. In an embodiment of the invention, the touchless keyboard system 100 comprises a plurality of the touchless keyboard device units operating independently of each other such that there is no electrical or mechanical connection or coordination between the various touchless keyboard device units. In an embodiment of the invention, the touchless keyboard device units are part of the same system 100 and are configured to be mounted on a same touch-sensitive elevator keyboard.

Figure 2A:
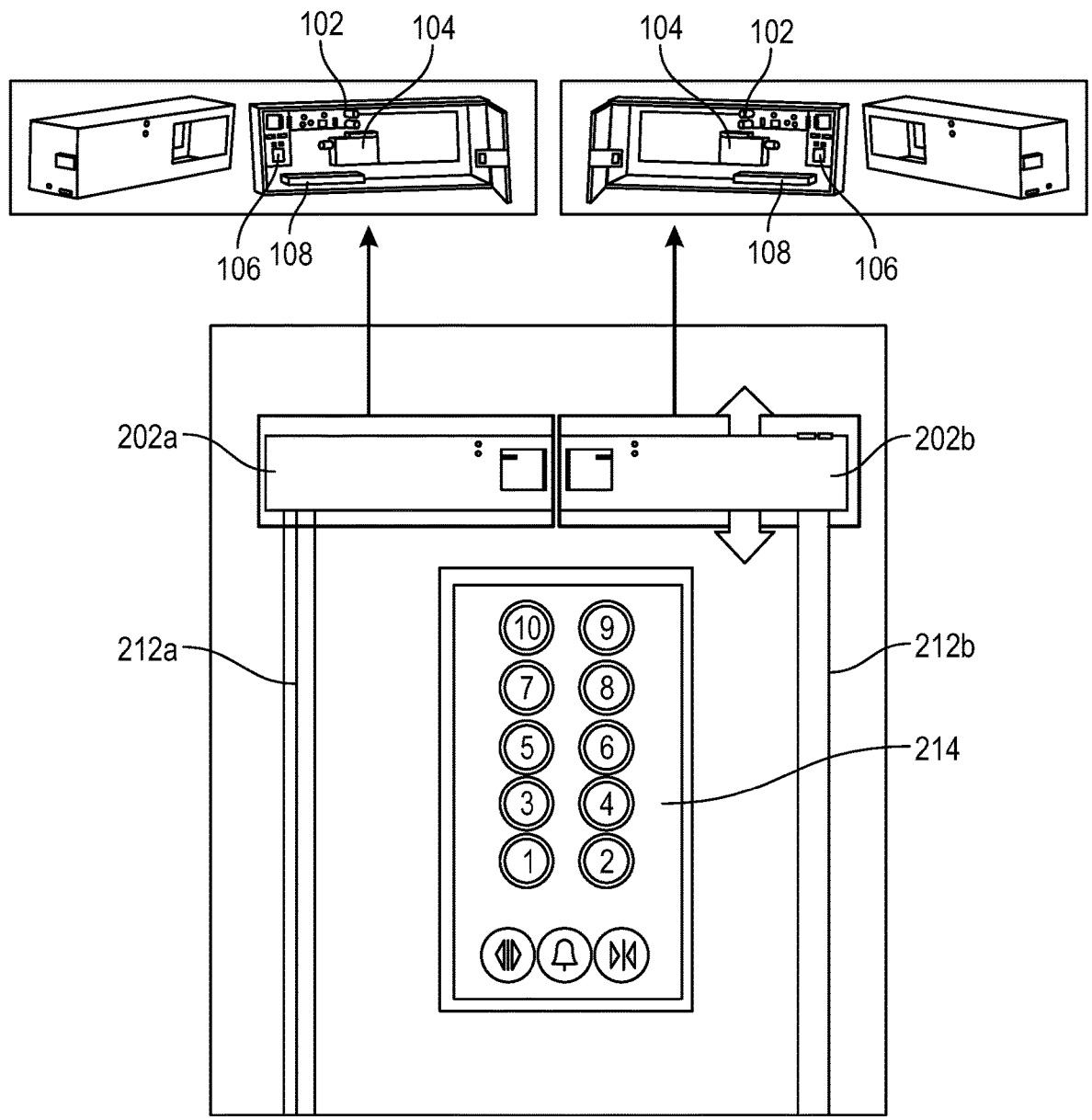
FIG. 2(a)-(d) illustrate embodiments wherein the touchless keyboard system is a bar structure positioned and moveable on sliding rails, in accordance with an embodiment of the present invention.
Figure 2B:
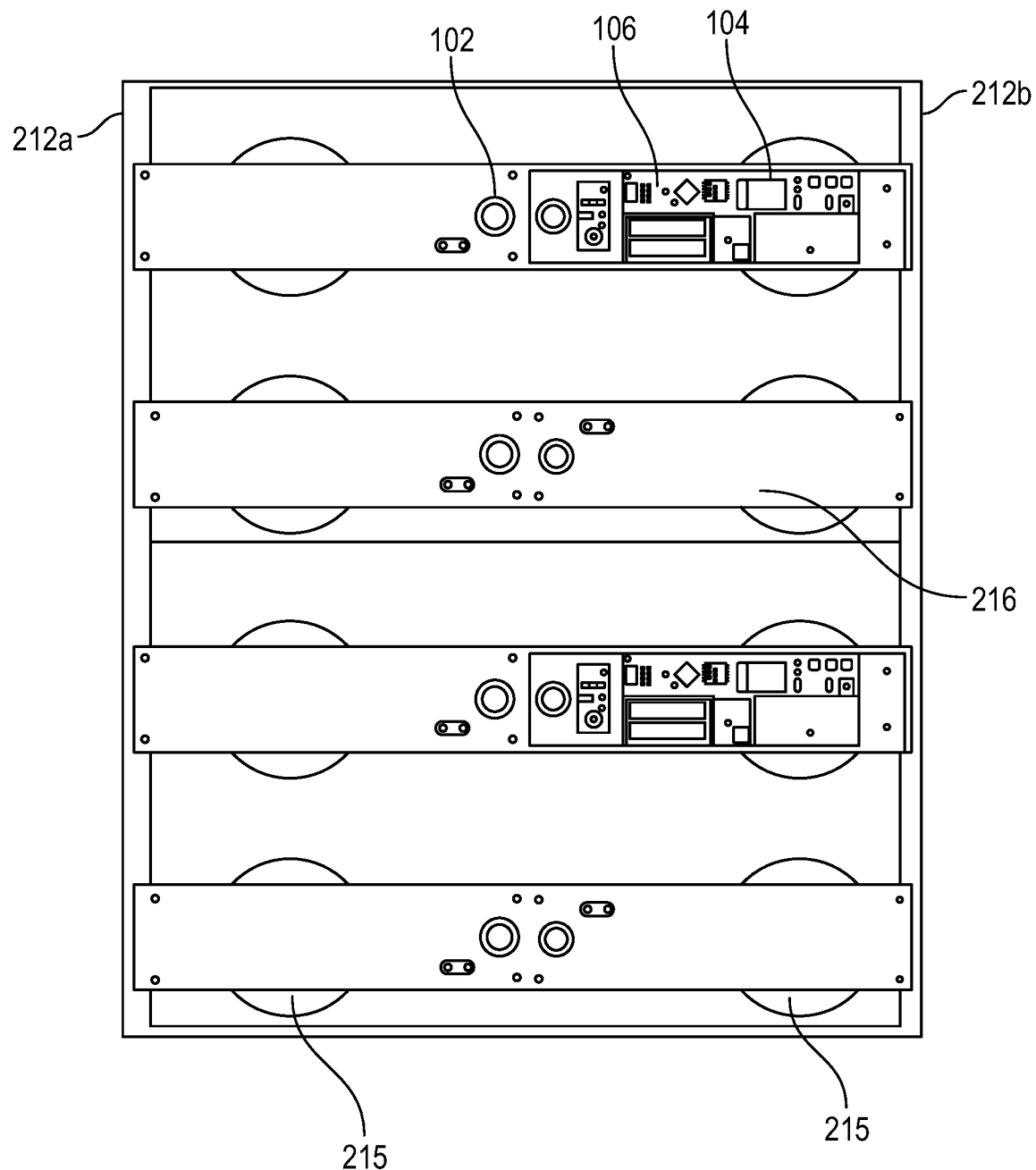
Figure 2C:
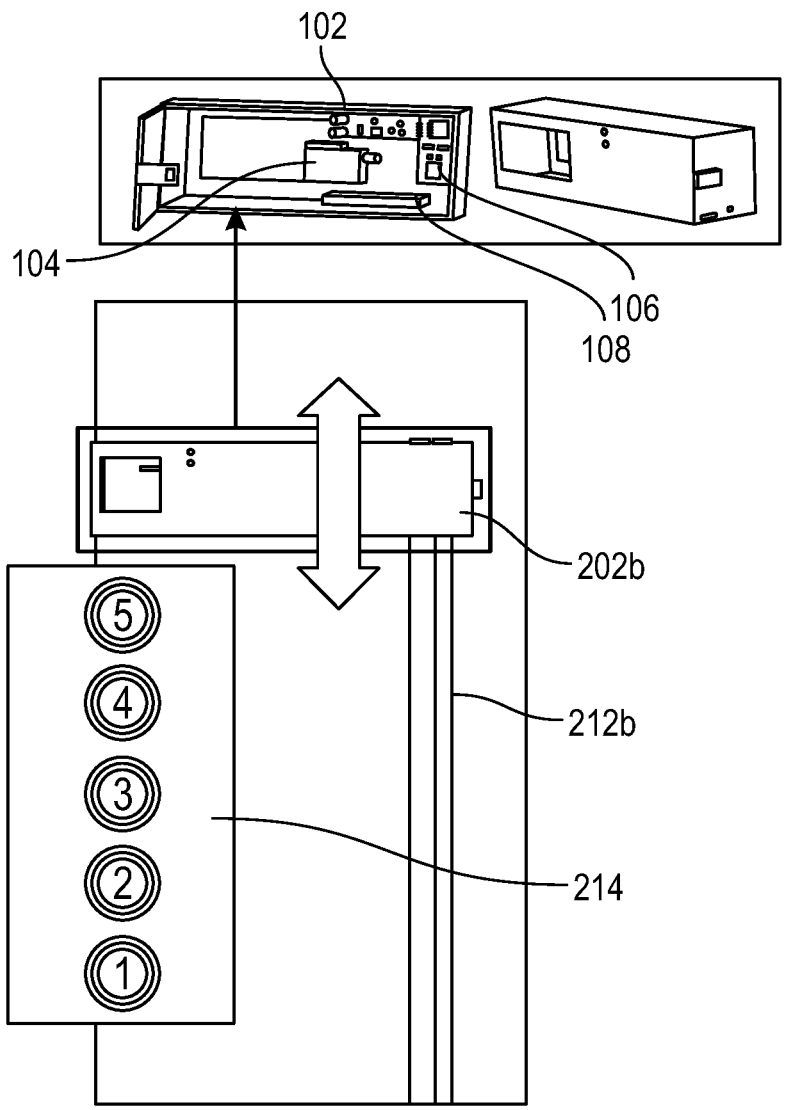

In an embodiment of the present invention and as shown in FIGS. 2(b) and (c), the touchless keyboard system 100 is configured for elevators with double buttons (or two column elevator buttons) 215. According to this embodiment, there is provided s touchless keyboard system 100 comprising side rails 212a and 212b mountable on the existing touch-sensitive keyboard of the elevators, the touchless keyboard system 100 comprising two independent touchless keyboard device units positioned side by side 216, where each unit comprises a detection device 102 comprising one sensor 103, an actuation device 104 comprising one actuator 105 and a controller 106.

In an embodiment of the invention, the at least one sensor 103 are voice sensors for capturing a voice signal of the users and the controller 106 is configured to receive and interpret the voice signals of the users and determine the opted floors based on these voice signals.

Figure 2D:
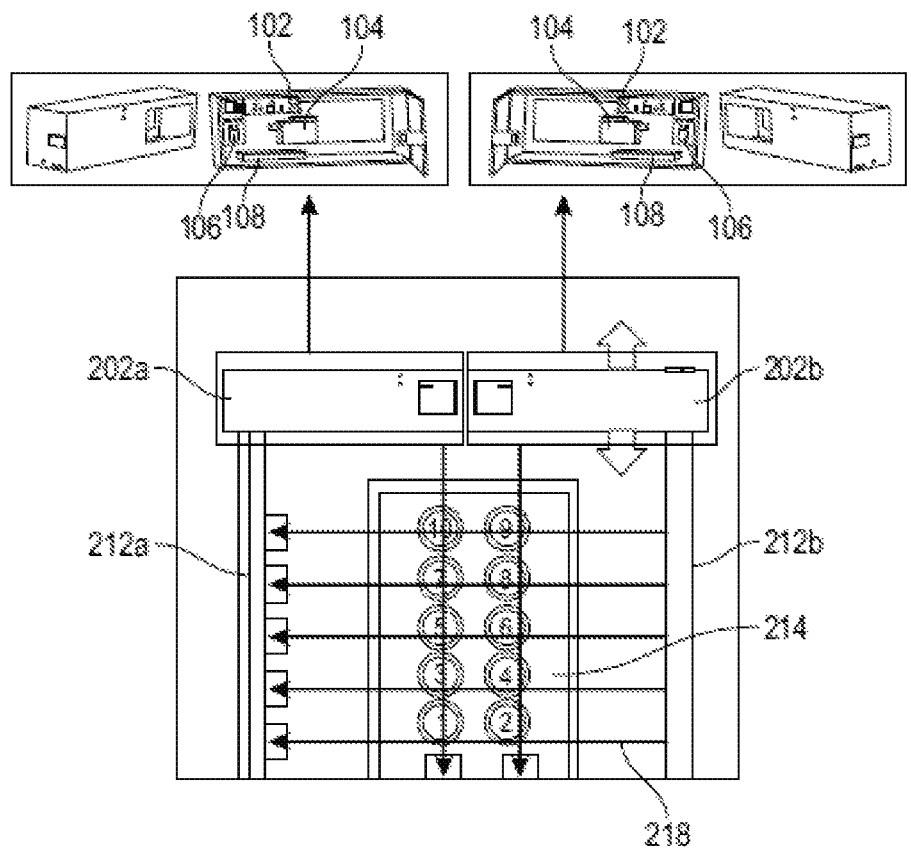

In another embodiment, as shown in FIG. 2(d), the touchless keyboard system 100 is equipped with a plurality of laser or LED sensors 218 which are capable of detecting a hand or finger of the user when approaching a desired button on the touch-sensitive keyboard of the elevator. Subsequent to this detection, signals are sent to the sliding touchless keyboard 216 to slide upwards or downwards to reach an apt position for the left or right actuator 105 to push the desired floor button.

In one embodiment of the invention, the actuation device 104 comprises sliding rails for enabling the at least one actuator 105 to move along the sliding rails to push the buttons on the existing touch-sensitive keyboard of the elevator corresponding to the opted floor, such that number of the at least one actuator is less than the number of buttons on the existing touch-sensitive keyboard of the elevator. In an embodiment, the at least one actuator is one actuator.

In an embodiment of the invention, each button on the existing touch-sensitive keyboard of the elevator is associated to an individual actuator (such as a pushing mechanism unit) placed in an individual enclosure (housing along with an associated individual controller and power source. Each independent touchless keyboard device unit comprises a sensor 103, an actuator 105, a controller 106 and preferably a power source 108 such as a battery. The advantage of this second design is the ease of replacing any independent unit on occurrence of a malfunction. In another embodiment of the invention, all sensors 103 and actuators 105 are connected to a single controller 106 and a single power source 108.

In an embodiment of the invention, the touchless keyboard system 100 further comprises an artificial intelligence device in communication with the controller 106 for receiving and analyzing user related physical and behavioral data over time to build intelligence information associated to the users, wherein the intelligence information is used by the controller for constituting the non-touch indications of the users for the opted floors of the elevator.

In an embodiment of the invention, the touchless keyboard system 100 further comprises a wireless communication unit in communication with the controller 106 and a display screen for displaying a QR code identifying the elevator for receiving selections for the opted floors from the users using a mobile application running on their personal electronic devices, wherein the communication unit of the touchless keyboard system is further configured to be wirelessly connected to the mobile application.

In an embodiment of the invention, the at least one actuator 105 is equal to the number of the buttons on the existing touch-sensitive keyboard of the elevator, such that each actuator among the at least one actuator 105 is configured to be operatively connected with one button among the buttons.

In an embodiment of the invention, there is provided a plurality of sensors and a plurality of actuators, where each actuator is located in proximity of an associated button on the elevator, such that the number of actuators is equal to the number of buttons on the existing touch-sensitive keyboard of the elevator.

Figure 3A:
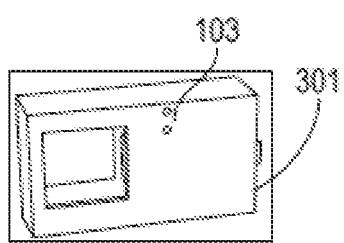
FIGS. 3(*a*) and (*b*) depict independent unit and single enclosure embodiments respectively, of the touchless keyboard, in accordance with various embodiments of the present invention.
Figure 3B:
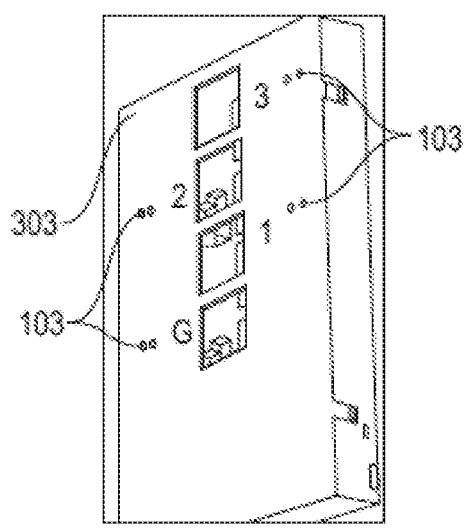

In an embodiment of the invention, as illustrated in FIG. 3(a), the touchless keyboard device unit further comprises a housing 301 configured to enclose/house the components associated thereto (a single sensor, a single actuator, a controller and preferably a power source). In an embodiment of the invention, as illustrated in FIG. 3(b), the touchless keyboard system 100 further comprises a housing 303 configured to enclose/house the components associated thereto (multiple sensors, multiple actuators, a controller and a power source). There is provided openings on the touchless keyboard system that can be used to push existing buttons on the existing touch-sensitive keyboard of the elevator in case the current system is unable to continue working or in case of any other emergency.

In another embodiment of the invention, the at least one sensor 103 is an Infra-Red sensor, and the number of the at least one sensor is equal to the number of the buttons on the existing touch-sensitive keyboard of the elevator, such that each sensor among the at least one sensor is configured to detect non-touch indications corresponding to one specific floor and one specific button among the buttons.

In an embodiment of the invention, in case two or more sensors detect an indication from the user at a same time (caused by holding hand or standing too close to the sensors, or by placing an obstacle in front of the sensors), an alarm is triggered indicating an error and the user is required to re-indicate a selection. The actuation device 104 waits for a pre-defined amount of time subsequent to receiving an indication from the user for an opted floor, to prevent rapid and faulty decisions (or false positives). In an embodiment, the pre-defined amount of time is 1 to 3 seconds. The controller 106 is configured to trigger an error message in case two or more sensors detect a same non-touch indication from a user within a predefined time period. In another embodiment, the controller 106 is configured to trigger the actuation device 104 only if a single non-touch indication is received from a user after a predefined period of time subsequent to receiving the non-touch indication. In another embodiment, the predefined period of time is around 3 seconds.

In an embodiment, considering the power source, the touchless keyboard system 100 is operated/configured to be operated by an independent rechargeable battery, such as a 5V rechargeable battery. In another embodiment, the touchless keyboard system 100 is directly connected to a power source of the elevator.

In another embodiment, the touchless keyboard system 100 further comprises an Artificial Intelligence (AI) device in communication with the controller 106 for receiving and analyzing user related physical and behavioral data over time to build intelligence information associated to the users, wherein the intelligence information is used by the controller 106 for constituting the non-touch indications of the users for the opted floors of the elevator. In an embodiment of the present invention, the at least one sensor 103 is a sound sensor and the indication from the user is a voice command. In another embodiment, the touchless keyboard system 100 is integrated with Artificial Intelligence (AI) for analyzing user mannerisms and enabling voice recognition and control capabilities on detection of a user with disabilities. Considering individuals with special needs using the elevator, the touchless keyboard system 100 tracks the current floor, and provides timely voice announcements for assisting the individual. Such special users can then follow voice/sound instructions and control the touchless keyboard system 100 via voice commands.

Figure 4A:
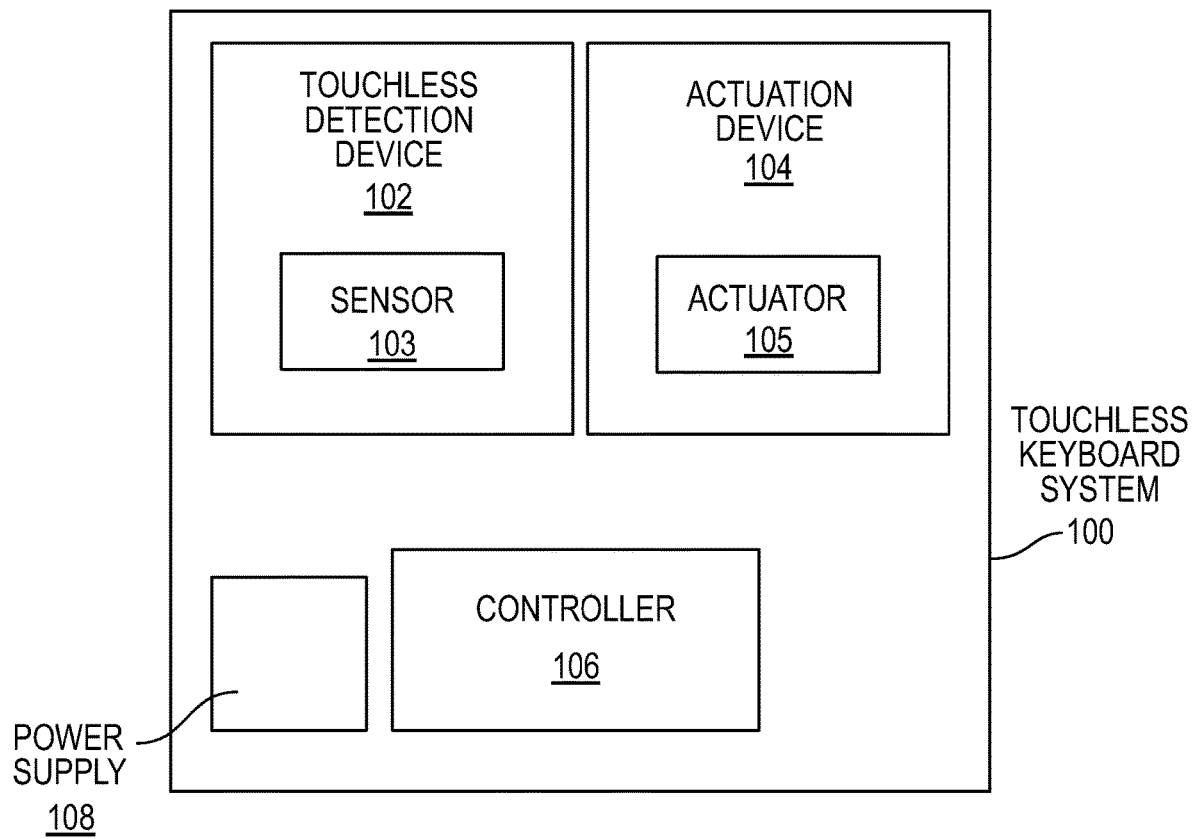
FIGS. 4(*a*) and (*b*) are block diagrams of the touchless keyboard system for an elevator, in accordance with an embodiment of the present invention.
Figure 4B:
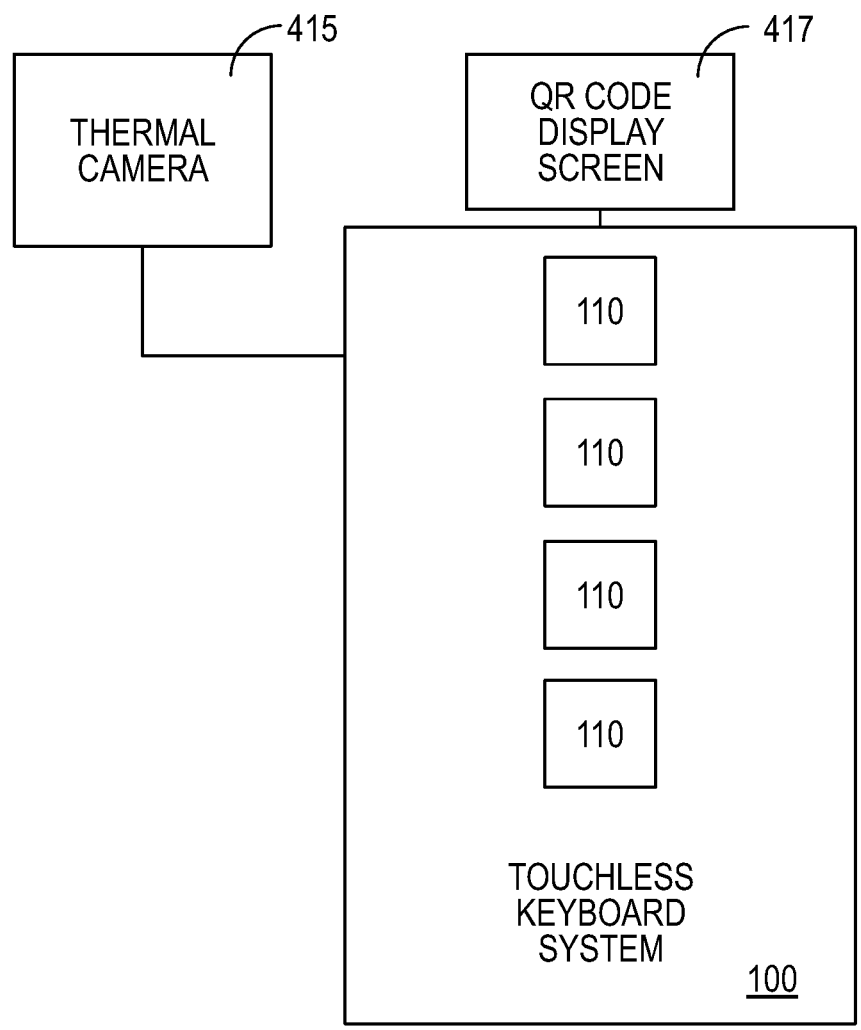

FIGS. 4 (a) and (b) are block diagrams of the touchless keyboard system 100 for an elevator, in accordance with another embodiment of the present invention operating in parallel with existing touch-sensitive elevator systems.

As shown in FIG. 4 (a), the touchless keyboard system 100 comprises a touch detection device 102 (comprising at least one sensor 103), an actuation device 104 (comprising at least one actuator 105) and a controller 106. FIG. 4 (b) further shows the touchless keyboard system 100 comprising a plurality of openings 110 (corresponding to each button on the touch-sensitive keyboard of the elevator) and a thermal camera 415 for monitoring and controlling number of users entering the elevator, and triggering an alarm if number of users exceeds a predetermined threshold value. The thermal camera 415 monitors and analyses real-time thermal images captured to count number of users occupying the elevator space, which is then compared with a pre-defined value based on the lift capacity. This aspect helps in ensuring social distancing between the number of users entering the elevator, wherein an alarm is triggered in case distance between individuals is less than a required value. The thermal camera 415 is further used for monitoring body temperatures of users entering the elevator and triggering an alarm if an abnormal body temperature is detected. The thermal camera 415 also enables highlighting high body temperatures of users to an elevator operator or controller.

In an embodiment of the invention, the touchless keyboard system 100 further comprises a wireless communication unit in communication with the controller 106 and a display screen 417 for displaying a QR code identifying the elevator for receiving selections for the opted floors from the users using a mobile application running on their personal electronic devices, wherein the communication unit of the touchless keyboard system is further configured to be wirelessly connected to the mobile application. In another embodiment, the touchless keyboard system further comprises a display screen 417 for displaying a QR code, enabling users to select a desired floor using personal electronic devices by scanning the QR code using the personal electronic devices. The QR code screen 417 is attached to the touchless keyboard system and provides users with an online interactive button system that can be used by the user to opt for a desired floor—which is then transmitted to the touchless keyboard controller via internet connection or BLUETOOTH. The QR code changes after every scan.

Figure 5:
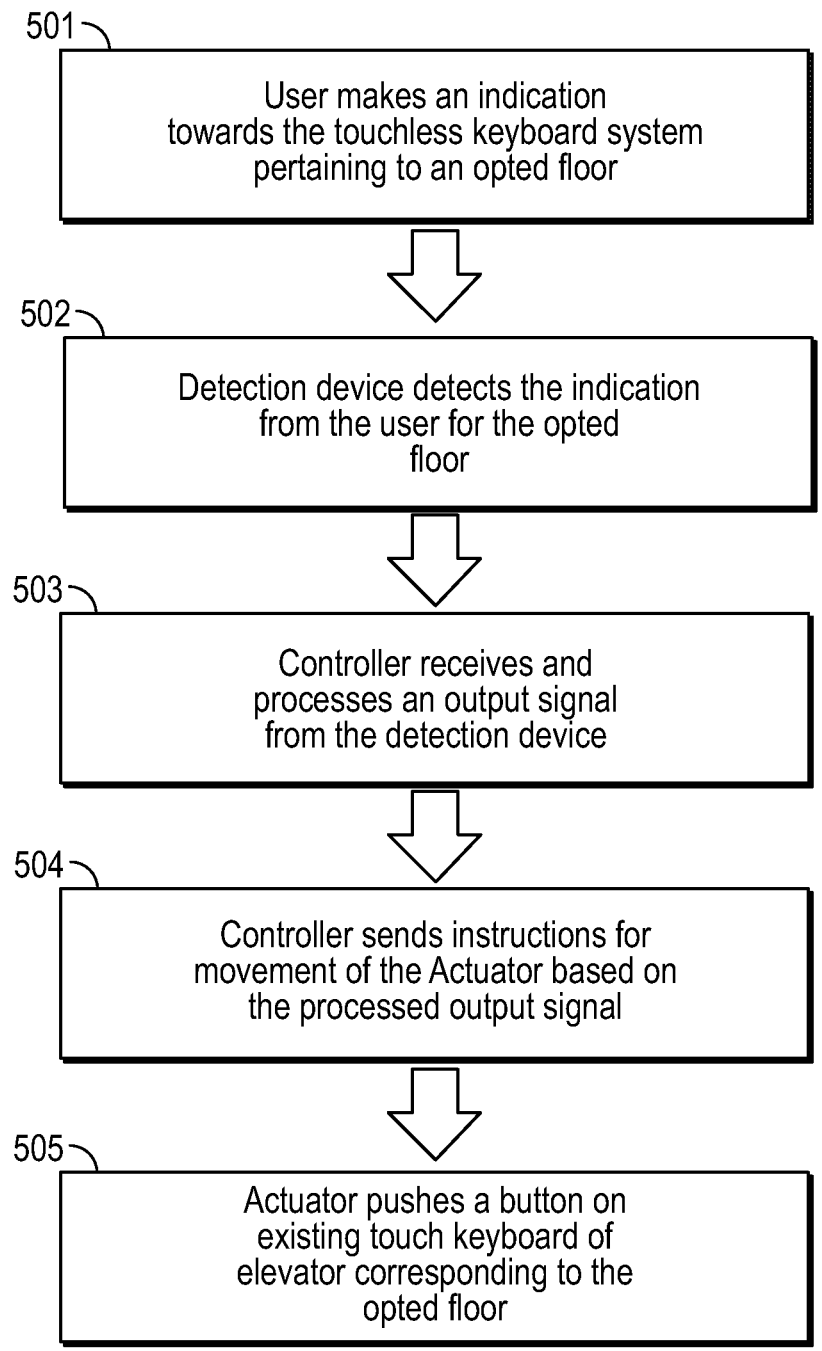
FIG. 5 is a flow chart depicting a method of operating an elevator through an existing touch-sensitive keyboard of the elevator (or overall working of the touchless keyboard system for an elevator), in accordance with an embodiment of the present invention.
Figure 6:
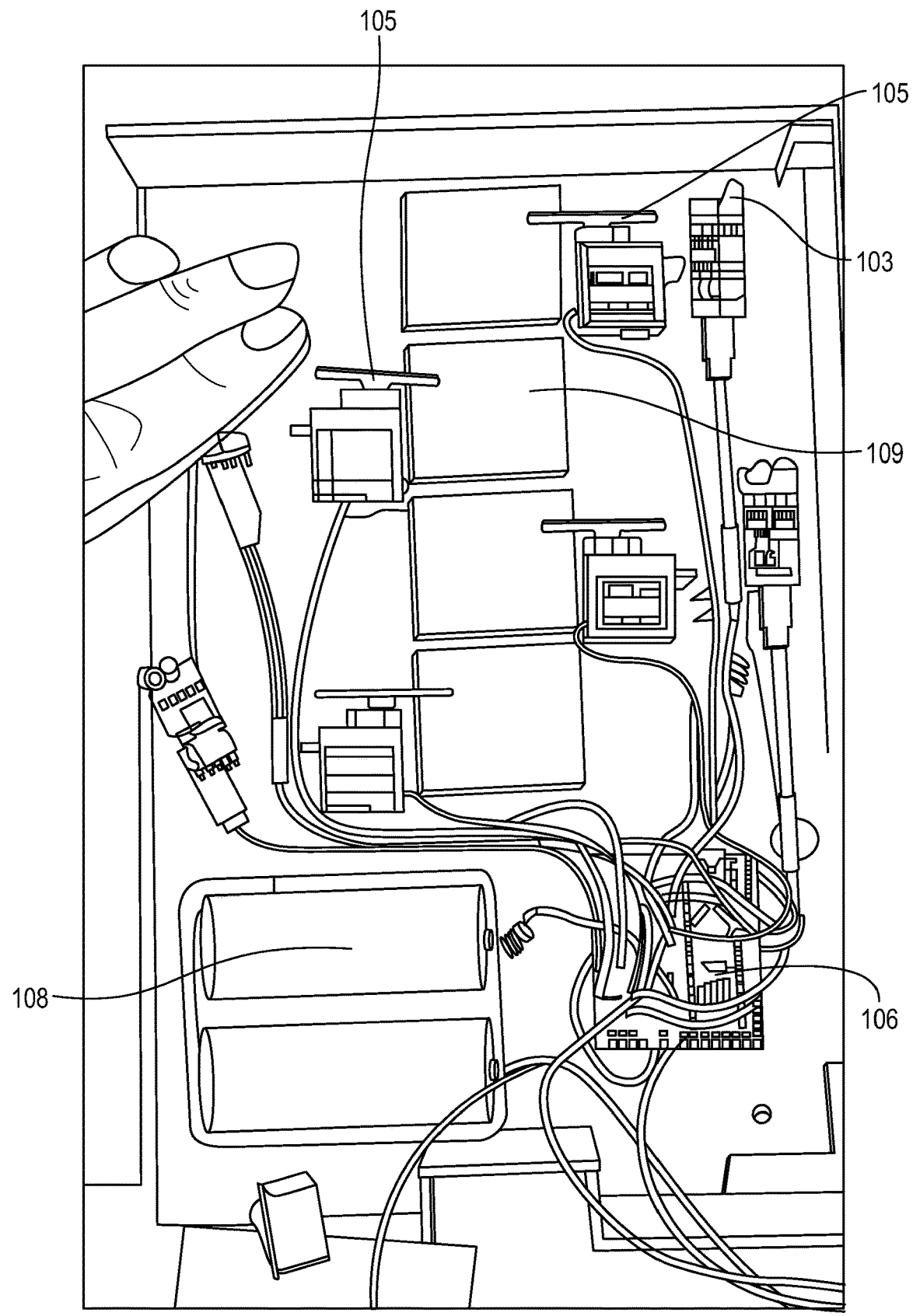
FIG. 6 denotes that the actuator hand is towards the elevator button so that the actuator can push the button, on sensing the user's hand—in accordance with the present invention.

FIG. 5 is a flow chart depicting overall working of the touchless keyboard system 100 for an elevator or a method of operating an elevator through an existing touch-sensitive keyboard of the elevator, in accordance with an embodiment of the present invention. The method comprises steps of using a touchless detection device 102 comprising at least one sensor 103 for detecting non-touch indications from users for opted floors, and based on the non-touch indications from the users, using an actuation device 104 comprising at least one actuator 105 for physically engaging buttons of the existing touch-sensitive keyboard of the elevator corresponding to the opted floors. In other words, as a first step, the user makes an indication towards the touchless keyboard system 100 pertaining to an opted floor (501). Next, the sensor detects the indication from the user for the opted floor 502 and the controller receives and processes an output signal from the sensor 503. Subsequently, the controller sends instructions to the actuator for movement based on the processed output signal 504. Finally, the actuator pushes a button on the existing touch-sensitive keyboard of the elevator corresponding to the opted floor 505. FIG. 6 shows that the actuator hand 105 is towards the elevator button 109 so that the actuator 105 can push the button, on sensing the user's hand.

In another embodiment of the invention, the touchless keyboard system 100 comprises an energy-saving mode which enables the touchless keyboard system 100 to save energy in case no users are present within the elevator. This in turn prolongs lifetime of the touchless keyboard system, minimizes heat emissions and overall power consumption.

In an embodiment of the invention, the touchless keyboard system 100 in accordance with the present invention is mechanically mountable on any existing button-based (touch-sensitive) elevator. In an embodiment, this mechanically mounting is done over or on top of an existing touch-sensitive keyboard of an elevator using magnets, clips or glue. Users still remain with a choice to operate elevators either by using the touchless keyboard system 100, through gesturing towards the buttons corresponding to an opted floor or level—or by physically pushing the already existing buttons of the touch-sensitive keyboard of an elevator. Considering an electrical aspect of the present invention, the touchless keyboard system is installed electrically, wherein a plurality of distance sensors are used to close the electrical circuit parallel to the electrical circuit of the actuator or push mechanism.

In another embodiment of the invention, the controller of the touchless keyboard system 100 is connected to a local WI-FI network. This enables the touchless keyboard system to possess Internet of Things (IoT) capabilities, and also enables administrative staff or elevator operators to set parameters for the touchless keyboard system using a Graphical User interface (GUI), and to easily and directly report malfunctioning or errors in any of the sensors or actuators.

In an embodiment of the invention, the touchless keyboard system 100 is low cost to manufacture and produce, adaptable and easy to assemble and maintain, and can be integrated with any existing systems already in operation.

In an embodiment of the invention, the touchless keyboard system 100 can be used in every elevator system with any existing keyboards having any number of buttons by adjusting the circuit or number of sensor-actuator components related to the system 100. This includes elevators installed in hospitals, malls, industries, etc.

In an embodiment of the invention, the touchless keyboard system 100 is connected/adapted to be connected to personal electronic devices through a mobile application.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A touchless keyboard system for operating an elevator through an existing touch-sensitive keyboard of the elevator, the touchless keyboard system comprising:
    a touchless detection device comprising at least one sensor for detecting non-touch indications from users for opted floors;
    an actuation device comprising at least one actuator for physically engaging buttons of the existing touch-sensitive keyboard of the elevator corresponding to the opted floors, and
    a controller in communication with the detection device and with the actuation device for receiving and processing output signals from the at least one sensor and controlling movement of the at least one actuator based on the processed output signals.

2. The touchless keyboard system of claim 1, wherein the at least one sensor is an infra-red (IR) sensor, a motion sensor or a proximity sensor and wherein the at least one actuator is a linear actuator or a push solenoid.

3. The touchless keyboard system of claim 1, further comprising a touchless keyboard housing for receiving the touchless detection device and the actuation device, where the touchless keyboard housing is configured to be operatively mountable to the touch-sensitive keyboard of the elevator.

4. The touchless keyboard system of claim 1, further comprising a power source for providing electrical power to the detection device, the actuation device and the controller.

5. The touchless keyboard system of claim 1, wherein the non-touch indications from the users are physical gestures comprising at least one of pointing of a finger or waving of a hand.

6. The touchless keyboard system of claim 3, wherein the touchless keyboard housing comprises openings for allowing manual engagement of the at least one actuator for operation of the elevator when required.

7. The touchless keyboard system of claim 1, wherein the at least one sensor comprises a sound sensor and the indications from the users comprise voice commands.

8. The touchless keyboard system of claim 1, further comprising a thermal camera for monitoring and controlling number of users entering the elevator, and triggering an alarm if the number of users exceeds a predetermined threshold value, and wherein the thermal camera is further configured for monitoring body temperatures of the users and triggering an alarm if an abnormal body temperature is detected.

9. The touchless keyboard system of claim 1, further comprising a wireless communication unit in communication with the controller and a display screen for displaying a QR code identifying the elevator for receiving selections for the opted floors from the users using a mobile application running on their personal electronic devices, wherein the communication unit of the touchless keyboard system is further configured to be wirelessly connected to the mobile application.

10. The touchless keyboard system of any one of claim 1, wherein the actuation device comprises sliding rails for enabling the at least one actuator to move along the sliding rails to push the buttons on the existing touch-sensitive keyboard of the elevator corresponding to the opted floors, such that number of the at least one actuator is less than the number of buttons on the existing touch-sensitive keyboard of the elevator.

11. The touchless keyboard system of claim 1, wherein number of the at least one actuator is equal to the number of the buttons on the existing touch-sensitive keyboard of the elevator, such that each actuator among the at least one actuator is configured to be operatively connected with one button among the buttons.

12. The touchless keyboard system of claim 1, wherein the at least one sensor is an Infra-Red sensor, and wherein the number of the at least one sensor is equal to the number of the buttons on the existing touch-sensitive keyboard of the elevator, such that each sensor among the at least one sensor is configured to detect non-touch indications corresponding to one specific floor and one specific button among the buttons.

13. The touchless keyboard system of claim 12, wherein the controller is configured to trigger an error message in case two or more sensors detect a same non-touch indication from a user within a predefined time period, and wherein the controller is configured to trigger the actuation device only if a single non-touch indication is received from a user after a predefined period of time subsequent to receiving the non-touch indication.

14. The touchless keyboard system of claim 1, further comprising an artificial intelligence device in communication with the controller for receiving and analyzing user related physical and behavioral data over time to build intelligence information associated to the users, wherein the intelligence information is used by the controller for constituting the non-touch indications of the users for the opted floors of the elevator.

15. The touchless keyboard system of claim 3, wherein the touchless keyboard housing is mechanically mountable over the existing touch-sensitive keyboard of the elevator using magnets, clips or glue.

16. A method of operating an elevator through an existing touch-sensitive keyboard of the elevator, the method comprising:
   using a touchless detection device comprising at least one sensor for detecting non-touch indications from users for opted floors; and
   based on the non-touch indications from the users, using an actuation device comprising at least one actuator for physically engaging buttons of the existing touch-sensitive keyboard of the elevator corresponding to the opted floors.

17. The method of claim 16, wherein the at least one sensor is an infra-red (IR) sensor, a motion sensor or a proximity sensor and the at least one actuator is a linear actuator or a push solenoid.

18. The method of claim 16, wherein the actuation device comprises sliding rails for enabling the at least one actuator to move along the sliding rails to push the buttons on the existing touch-sensitive keyboard of the elevator corresponding to the opted floors, such that number of the at least one actuator is less than the number of buttons on the existing touch-sensitive keyboard of the elevator.

19. A touchless keyboard device unit for operating a single button of an elevator through an existing touch-sensitive keyboard of the elevator, the touchless keyboard device unit comprising:
   a sensor for detecting a non-touch indication from a user for an opted floor;
   an actuator for physically engaging the buttons of the existing touch-sensitive keyboard of the elevator corresponding to the opted floor, and
   a controller in communication with the sensor and with the actuator for receiving and processing an output signal from the sensor and controlling movement of the actuator based on the processed output signal;
   a power supply for providing power to the sensor, the actuator and the controller; and
   a housing for enclosing the sensor, the actuator and the controller, and the power supply.

20. A touchless keyboard system for operating an elevator through an existing touch-sensitive keyboard of the elevator, the touchless keyboard system comprising a plurality of touchless keyboard device units in accordance with the device of claim 19.

* * * * *